Figure 1:
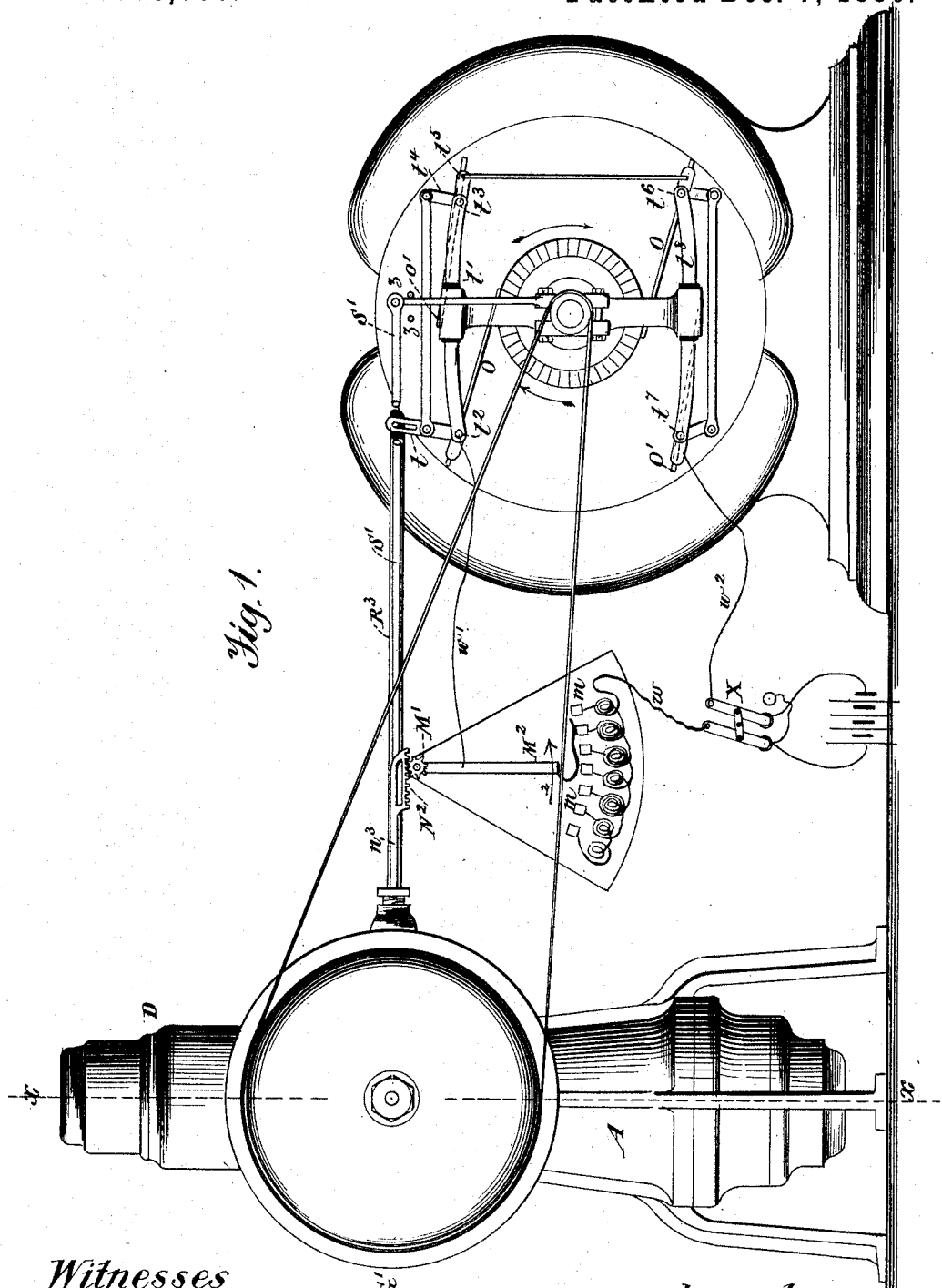

(No Model.) 3 Sheets—Sheet 1.

E. A. SPERRY.
ELECTRIC REGULATOR.

No. 353,990. Patented Dec. 7, 1886.

Witnesses
A. Ruppert
E. T. Gaddis

Inventor
Elmer A. Sperry
by J. R. Nottingham atty

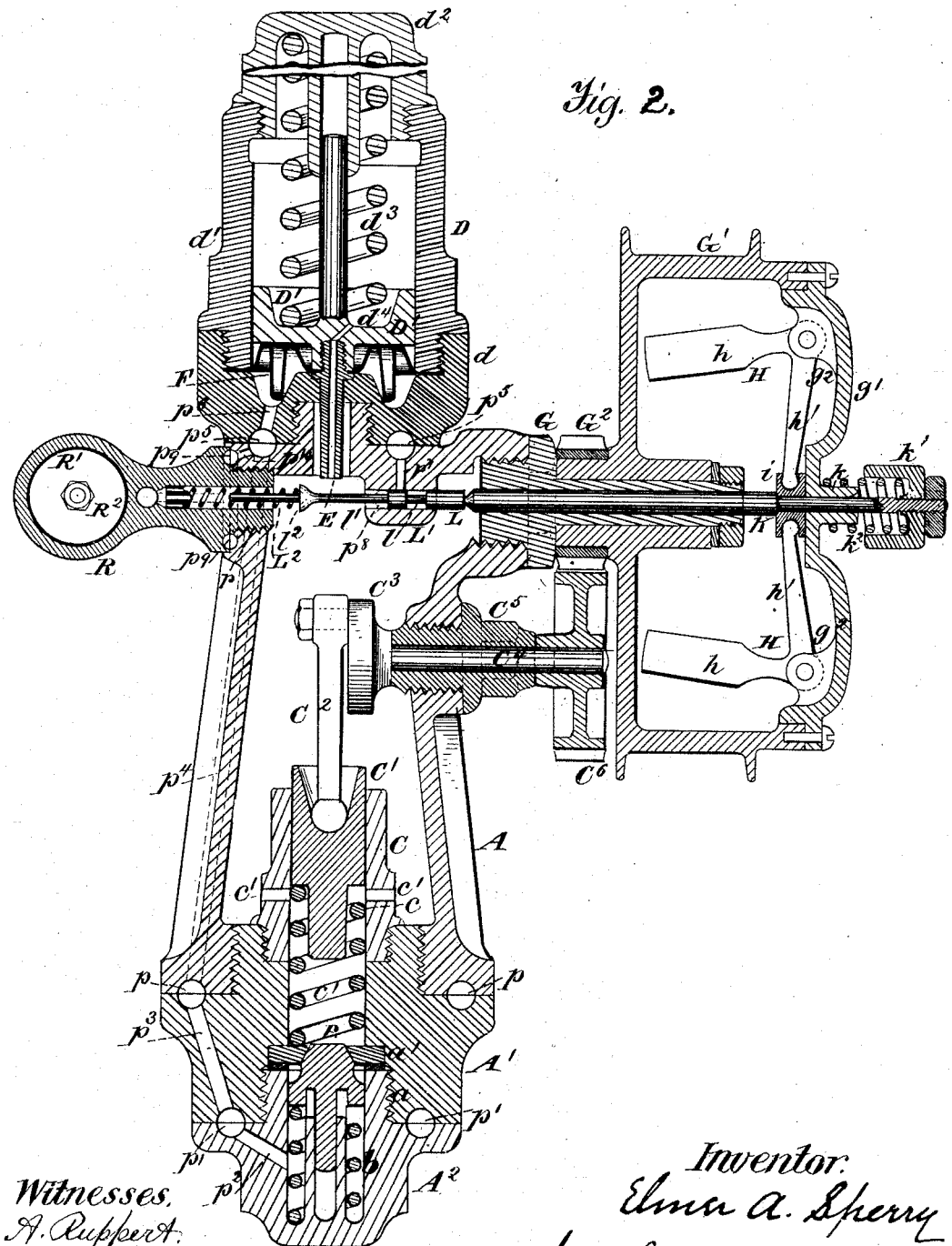

(No Model.) 3 Sheets—Sheet 3.
E. A. SPERRY.
ELECTRIC REGULATOR.
No. 353,990. Patented Dec. 7, 1886.
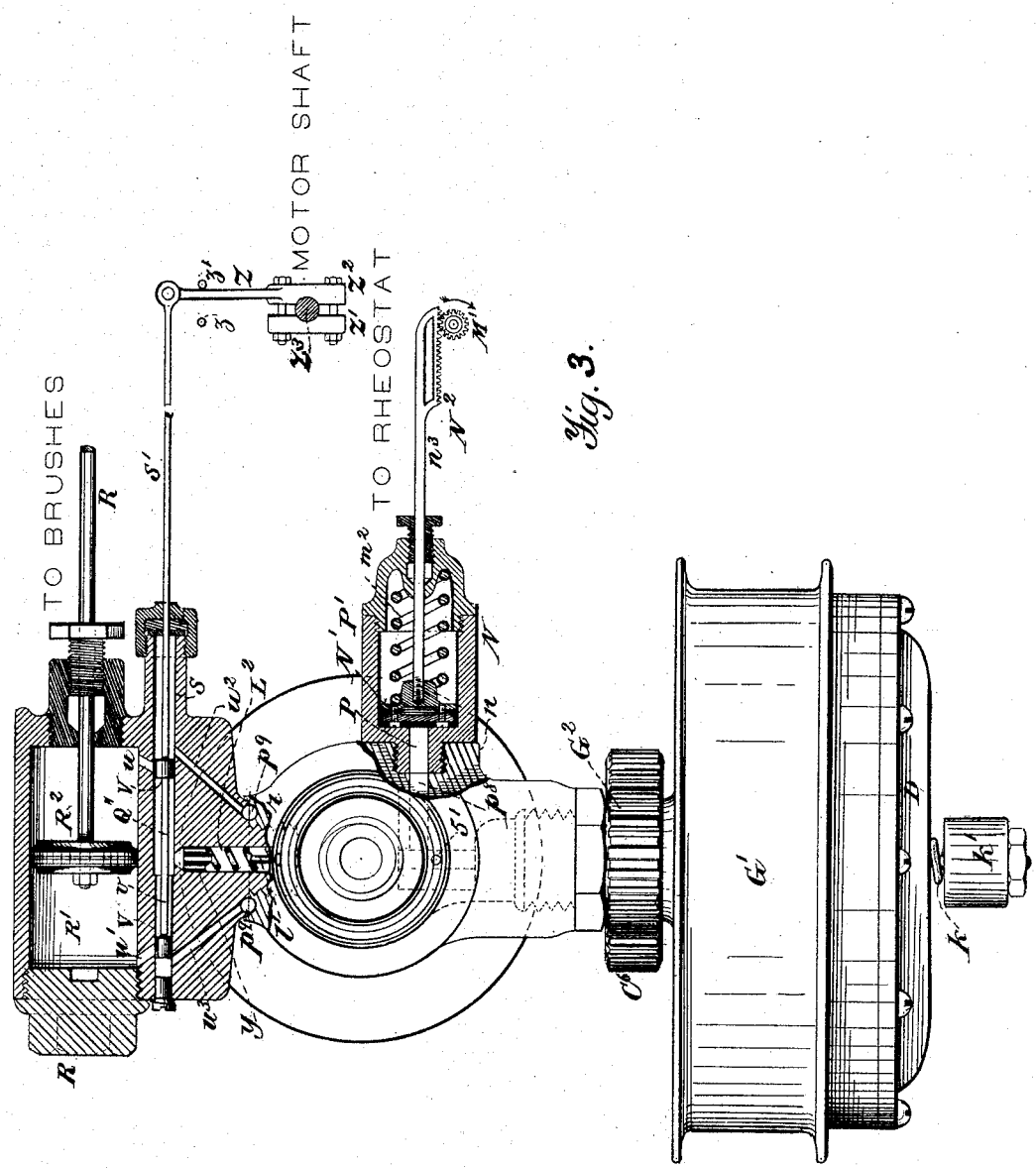

UNITED STATES PATENT OFFICE.

ELMER A. SPERRY, OF CHICAGO, ILLINOIS.

ELECTRIC REGULATOR.

SPECIFICATION forming part of Letters Patent No. 353,990, dated December 7, 1886.

Application filed November 1, 1883. Renewed May 8, 1886. Serial No. 201,598. (No model.)

*To all whom it may concern:*

Be it known that I, ELMER A. SPERRY, a citizen of the United States, residing at Chicago, in the county of Cook and State of Illinois, have invented certain new and useful Improvements in Electric Regulators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a hydraulic apparatus for regulating the electric current supplied to an electric motor in accordance with varying demands upon the motor for power, and for adjusting the brushes of the motor in correspondence to the direction of rotation of the armature.

The brushes or wipers which communicate the current to the commutator of an electric motor are usually thin elastic sheets or plates supported in position approximately tangential to the periphery of the commutator, with their free ends resting thereupon at diametrically-opposite points. When the commutator turns in a direction outward from the end edges of the brushes, the latter will not be injured by jamming, bending, or doubling up; but if the commutator rotates toward the end edges of the brushes—that is, in a direction opposite that in which they extend to the commutator—they will frequently be so jammed and bent out of shape as to become useless. In an invention for which I have heretofore applied for patent I have obviated danger of injury to the brushes by providing a motor with two pairs of brushes and connecting said pairs with automatic mechanism for shifting one pair out of contact and the other pair in contact with the commutator at every change of direction of rotation in the latter, the pair in contact being always in position corresponding to the direction of rotation. In one form of my said previous invention the brush-shifting devices are operated directly by reversals of motion in the commutator or armature shaft, in another form by spring mechanism tripped into action by devices connected with said shaft, and in another form by electromotive devices partly controlled by devices operated by reversal of said shaft.

The object of my present improvement is to provide a promptly and vigorously operating apparatus deriving power mechanically from the motor of which it forms an adjunct, and adapted to both shift the brushes to properly correspond in position to the direction of the commutator, and to operate devices for regulating the electrical current supplied to the motor.

The invention consists in an organization of hydraulic devices controlled by a centrifugal governor adapted to be operated by an electric motor, and in the combination of said devices with the brushes and with a regulator for varying the strength of current supplied to the motor, all as will be hereinafter particularly described in connection with the accompanying drawings, and definitely pointed out in the appended claims.

In the drawings, Figure 1 is a side view of an electric motor having my improved brush-shifting and current-regulating apparatus connected therewith. Fig. 2 is a vertical section of the apparatus in a plane indicated by the line $x$ $x$ of Fig. 1, and Fig. 3 is a top view of the apparatus, with certain parts shown in horizontal section.

The letter A indicates a hollow approximately-cylindrical casting, into a lower end of which is screwed a centrally bored plug, A', to the under side of which is attached a chambered cap, A², by means of a nipple, $a$, screwed into a threaded socket in the plug, and binding a valve seat plate, $a'$, against a shoulder at the upper end of the socket. In the chamber of the cap A² is a valve, B, which by a spring, $b$, is forced against the seat formed in plate $a'$. In the upper end of plug A is screwed a pump-barrel, C, in which plays a plunger, C', which is forced upward by a spring, $c$, and driven downward by a pitman, C², connected to a wrist-pin of a crank-wheel, C³, fixed to the end of a shaft, C⁴, mounted in a bearing-box, C⁵, screwed into one side of the trunk A, said shaft carrying at its outer end a gear-wheel, C⁶, through which it receives rotary motion, as will presently be described. Ports $c'$ $c'$ are formed in the barrel C', to permit the inflow of water when the plunger is forced up by the spring. At the junction of the plug A' with the trunk A is an annular passage, $p$, half of which is formed in the plug and half in the edge of the trunk, and at the junction of the plug and cap $A^2$ is a similar annular passage, $p'$, half of which is formed in each of the two said parts. The passage $p'$ is connected with the chamber under the valve B by a passage, $p^2$, and is connected with the passage $p$ by a passage, $p^3$, the passage $p$ being in turn connected by a passage, $p^4$, formed in the shell of trunk A, as indicated in dotted lines, with certain passages at the upper end of the trunk A, and which will be presently referred to.

On the top of the trunk A is arranged an accumulator, D, consisting of a chambered base, $d$, a main shell or barrel, $d'$, and cap $d^2$, the main shell being provided with a piston, D', guided by a stem moving in a socket formed in the cap, said piston being forced down by a spring, $d^3$. The base $d$ is screwed upon a centrally-bored nipple which projects from the top plate of the trunk, and at the center of said base is an aperture through which projects a hollow needle-valve, E, secured centrally to the piston, and having its bore in communication with the chamber above said piston by means of a passage $d^4$. Between the lower edge of the shell $d'$ and the base $d$ is secured the edge of a flexible diaphragm, F, the center of which is secured to the piston around the needle-valve E.

At the junction of the base $d$ with the top of trunk A is an annular passage, $p^5$, which is in communication with the chamber of base $d$ below the diaphragm by means of a passage, $p^6$, and which is connected with the chamber under the valve B through passages $p^4$, $p$, $p^3$, $p'$, and $p^2$.

From one side of the trunk A, at the upper end thereof, projects a short neck, $g$, into which is screwed a hollow spindle, G, upon which is mounted a hollow pulley, G', having fixed upon its hub a gear-wheel, $G^2$, which meshes with the gear-wheel $G^6$. The outer removable wall or cap, $g'$, of the pulley G' has on its inner side lugs $g^2$, to which is pivoted bell-crank lever H, with weighted arms $h$ $h$, projecting from the pivots toward the back of the pulley, and arms $h'$ $h'$ extending toward the center thereof and loosely connected by ball-and-socket joints with a collar, $i$, which is fixed upon a sliding rod, K, extending through the hollow spindle G and projecting outwardly through a bearing, $k$, formed at the center of the pulley-cap. The outwardly-projecting end of the rod K is provided with an adjustable abutment, $k'$, between which and the pulley-cap is arranged a spiral spring, $k^2$, the office of which is to press the rod K outward and exert a centripetal force upon the bell-crank levers H H. The inner end of the rod K is provided with a conical point, the tip of which bears against the end of a sliding cylindrical valve, which plays in a passage formed for it in a projection, L', depending from the top of the trunk A. This valve has an intermediate reduced portion, $l$, and a stem, $l'$, which projects in the opposite direction from rod K, and is provided with a shoulder, $l^2$, bearing against a spring, $L^2$, which is supported in a manner to be presently described. The passage in which the valve L plays is connected with the annular passage $p^5$ by a short passage, $p^7$, and from said valve-passage also leads a horizontal passage, $p^8$, through the projection L' and the wall of trunk A.

A horizontal barrel or cylinder, N, has one end secured to the trunk A by means of a nipple, $n$, screwed into a socket into which the passage $p^8$ opens, and the central bore of said nipple connects said passage with the interior of the barrel N. In the said barrel is a piston, N', which is pressed inwardly by a spring and is provided with a piston-rod, $n^3$, which projects through a stuffing-box in the outer end of the barrel and carries a rack, $N^2$, meshing with a pinion, M', from one side of which projects a metallic arm, $M^2$, the outer end of which is arranged to traverse a segmental row of rheostat-contacts, $m$.

To one end of the rheostat is connected a conducting-wire, $w$, leading from one part of a pole-changer, X, and from the arm $M^2$ a wire, $w'$, leads to the brushes O O' on one side of the commutator Q, while from the other part of the pole-changer a wire, $w^2$, leads direct to the brushes O O' on the other side of the commutator. The two parts of the pole-changer are connected to the opposite poles of a generator, which supplies the current for operating the motor, said generator being conventionally indicated in the drawings. A dynamo-electric generator is preferred. As will be readily perceived, the rheostat is to be operated by the rod $n^3$ and rack $N^2$, to regulate the amount of current supplied to the motor. The operation will be hereinafter explained. To the opposite side of the trunk A from the pulley G' is secured a casting, R, by means of a nipple, $r$, and at the junction of the shoulder which surrounds the base of this nipple with the trunk there is an annular passage, $p^9$, which communicates with the annular passage $p^5$ by a short passage, $p^{10}$.

In the body of the casting R is formed a horizontal cylindrical chamber, R', in which plays a piston, $R^2$, provided with a piston-rod, $R^3$, extending through the stuffing-box in the usual manner, and having its outer end connected with but insulated from an arm, $t$, which projects from a pin, $t^2$, which turns in the end of a metal bar, $t'$, supported horizontally on one side of the commutator, and having a similar pin, $t^3$, turning in its other end and provided with two arms, $t^4$ and $t^5$, at right angles. To these pins are secured the brushes O and O' on one side of the commutator, and two other pins, $t^6$ and $t^7$, similarly supported by the bar $t^8$, and provided with arms carrying the brushes O and O' on the other side. The arm $t$ is connected by a link with arm $t^4$. The corresponding arms, $t^6$ and $t^7$, are similarly connected, and the arm $t^5$ is connected by a link with a similar arm projecting from pin $t^5$. The brushes are so connected to the pins that when the pair of brushes O O are in contact with the commutator the brushes O′ O′ will be thrown out of contact, and if the arm $t$ be then swung to the left all the pins will be turned by reason of their link-connection, and the brushes O O will be thrown out of contact, and the brushes O′ O′ will be brought into contact, with the commutator.

Parallel with the chamber R′ in the casting R is a passage, S, closed at the rear end and provided at the front end with a stuffing-box, through which plays a rod, S′, which operates two valves, V and V′, fitted to slide within the passage S and connected by a stem, $v$, these valves serving to open and close two passages, $u$ and $u'$, which connect the chamber R′ with the passage S, and also to control two other passages, $u^2$ and $u^3$, which connect the opposite ends of passage S with the annular passage $p^9$ at the junction of the casting and the trunk A. The valves V and V′ are so arranged that both the passages $u$ and $u'$ may be opened at the same time by a movement of the valves in either direction; but when they move rearwardly the passage $u^3$ will be closed and the passage $u'$ will be opened between the valves, and the passage $u$ and $u^2$ will be opened in front of valve V, while by a forward movement the passage $u$ will be opened between the valves, the passage $u^2$ will be closed, and the passages $u'$ and $u^3$ will be opened behind valve V′. At about the middle of passage S it is intersected by the prolonged bore of the nipple $r$, which secures the casting R to the trunk A, and in this bore is fixed a perforated stop or abutment, $y$, against which bears one end of the spring L², the other end of which bears against the shoulder $l^2$ of the valve-stem $l'$, as heretofore stated.

The outer end of the valve rod S′ is connected to an arm, Z, which projects from one of two clamping-pieces, Z′ and Z², which embrace the commutator-shaft Z³ with a light frictional pressure, which may be regulated by the nuts upon the bolts which connect the two clamping-pieces, the friction being properly just sufficient to cause the clamping-pieces to be turned with the shaft, if unopposed, but to oppose no considerable resistance to the turning of the shaft if stopped while said shaft is in motion. Two stops, $z$ $z'$, limit the motion of the arm Z as it is carried by the shaft in either direction, and are at such a distance apart as to allow the rod S to give the valves the rearward and forward movements heretofore described.

The operation of the apparatus as now described is as follows: The pulley G′ is to be connected by a belt with a pulley on the armature and commutator shaft, as indicated in Fig. 1. The trunk A is to be filled above the crank-wheel C³ with water, the plunger being raised to allow the barrel and chamber below to be filled at the same time, and the piston-rod R³ is adjusted by hand to place either of the pairs of brushes O O or O′ O′ in contact with the commutator, according to the direction in which the commutator is to turn. If in the direction indicated by the arrows, (see Fig. 1,) the brushes O O will be placed in contact with the commutator, as shown in Fig. 1, and the clamping-pieces and arm Z will also be adjusted by hand, so that the said arm rests against stop $z'$. The valves V and V′ will then be in position, as shown in Fig. 3. The arm M² of the rheostat should be adjusted so as to rest in contact with the first one of the series of rheostat-plates $n$, which will cause the full amount of current to be communicated to the commutator, and the tension of spring $k^2$ and L² should be so regulated that the valve L will be held in position to close the lower end of passage $p^7$, while the passage $p^3$ is opened to the interior of the trunk through the valve-passage. The current which supplies the motive current being now closed, with the pole-changer in proper position, the motor will be started into operation and the belt will transmit motion to pulley G, the gear G² will turn gear-wheel C⁶, and the pump within the trunk A will be thus started into operation, forcing water through passages $p^2$ $p'$ $p^3$ $p$ $p^4$ $p^5$ $p^6$ into the accumulator under the piston D′ and diaphragm and into all of the passages open to annular passage $p^5$, filling also the chamber R′ behind the piston R². The piston and diaphragm are forced upward by the water against the pressure of spring $d^3$, and when the piston draws the needle-valve E out of the passage in which it fits in the center of base $d$ the surplus water will flow back through said passage to the pump-chamber in the trunk. Any water which leaks to the upper side of the piston will flow back through passage $d^4$ and the needle-valve to the trunk. As the pulley G rotates, the weighted arms $h$ of the levers H H will be swung outward by centrifugal force, and the arms $h'$ $h'$ will drive the rod K inwardly and move the valve L inwardly, so that the passages $p^8$ and $p^7$ will be connected by the space around the reduced portion of the valve. Water will then flow from annular passage $p^5$ through passages $p^7$ and $p^8$ to the barrel N and drive the piston N′ and its rod and rack outward, turning the pinion M′ and swinging the arm M² to contact with other rheostat-plates, so that increased resistance will be placed in the circuit and the force of the current supplied consequently reduced. The motor having attained the desired speed, the abutment $k'$ should be adjusted to so regulate the tension of spring $k^2$ that at such speed the weighted arms $h$ will stand in position to hold the valve G far enough inward to close the inner end of passage $p^8$, this position of the valve being indicated by the fact that the piston-rod $n^3$ remains stationary, no water being either admitted to or escaping from the barrel N. Now, as long as the motor has its normal load no change will occur in the rheostat; but should the load be increased a tendency to a reduction of speed would immediately follow. The arms $h$ $h$ would swing inwardly and allow the spring L² to cause the valve G to open passage p⁸, and enough water would escape from barrel N to allow the piston N' to move inwardly, so that the rod and rack would turn pinion M' to swing the arm M² in the direction indicated by arrow No. 2, and thus cut out of the circuit a sufficient resistance to give such an increase of current as would restore the normal speed of the motor. The normal speed being restored, the valve G, as before explained, will close passage p⁸ and the rheostat-arm will remain stationary.

If, instead of a tendency to decrease, the speed of the motor should tend to increase, the weighted arms h h would swing outward from the normal position, the valve G would connect passages p⁷ and p⁸, and more water would flow into barrel N, and consequently the rheostat-arm M² would be adjusted to add a sufficient resistance to the circuit to check the tendency to increased speed, as will be readily understood from the explanation already given.

Should it become desirable to reverse the direction of movement of the motor, the reversal of the current by the pole-changer in the ordinary manner will effect such result, and as soon as the armature shaft begins to move in the reverse direction the arm Z will be swung against the stop z, and the rod S' will shift the valves V and V' rearward, so that the passage u will be opened between the valves, the passage u³ closed, and the passages u' and u² will both open into passage S in front of valve V. Water will then flow to the front side of piston R², through the passages heretofore described, and drive it rearwardly, the water at the rear side escaping through passage u to the portion of passage S between the valves, and thence flowing back to the trunk through the bore of the nipple r. The rearward movement of the piston rod K³ causes arm t to be swung to the left, and through the link-connections, as already explained, the pins which carry the commutator-brushes will be turned to throw the brushes O O out of contact and the brushes O' O' in contact with the commutator, these latter brushes having the proper position with relation to the commutator to prevent them from being injured by the rotation of said commutator in the new direction, while the brushes O O would be liable to be bent and have their edges injured by the rotation of the commutator against them should they remain in contact therewith. It will be readily seen that whenever the direction of the commutator is changed the brushes will be shifted to correspond with the movement.

Having now described a mechanism practically embodying the essential principles of my invention, I wish it to be understood that I do not confine myself to the precise construction of the apparatus as shown in my drawings, and set forth in the foregoing specification, but reserve to myself the right to vary any or all of the parts in any manner for the more efficient carrying out of the objects of the improvement without departing from the true spirit and scope thereof.

What I claim is—

1. The combination, with an electric motor provided with two pairs of brushes for its commutator and an adjustable rheostat connected in the supply-circuit of said motor, of hydraulic motive devices arranged to shift the brushes in accordance with the direction of motion of the commutator and to adjust the rheostat in accordance with variations of speed of the motor, and a governor operated by the motor and arranged to control the rheostat-adjusting devices, substantially as described.

2. The combination, with an electric motor provided with two pairs of brushes arranged to rest alternately upon its commutator, of a hydraulic motor provided with devices connected with said brushes for shifting the same to and from the commutator, and a valve arranged to be changed by reversals of motion in the commutator-shaft for operating the brush-shifting devices, substantially as described.

3. The combination, with an electric motor, its supply-circuit, and an adjustable rheostat arranged in said circuit, of a hydraulic motor connected with said rheostat for adjusting the same, and a governor operated by the electric motor and arranged to automatically control the rheostat-adjusting devices, substantially as described.

4. The combination, with an electric motor having two pairs of adjustable commutator-brushes arranged for alternate contact with its commutator, and an adjustable rheostat arranged in the supply-circuit of said motor, of a hydraulic motor having its liquid-forcing devices operated by said electric motor, and provided with motion-transmitting devices connected with said brushes and rheostat for adjusting the same, and provided, also, with a valve operated by changes of direction in the commutator-shaft for controlling the brush-shifting devices, and a separate valve arranged to control the rheostat-adjusting devices, and a centrifugal governor operated by the electric motor and arranged to control the valve of the said rheostat-adjusting devices, substantially as described.

5. In a hydraulic attachment for electric motors, the combination, with the trunk, its inclosed pump, and means for operating said pump, of the barrel N, its retractile piston, and the rod arranged for connection with the current-controller of a rheostat, suitable passages connecting said cylinder with the discharge of the pump, a valve arranged to control the flow of liquid to said barrel, and a governor arranged to control said valve, substantially as described.

6. In a hydraulic attachment for electric motors, the combination, with the trunk, its inclosed pump, and means for operating said pump, of the chamber R', its piston and rod arranged for connection with the brushes of an electric motor, suitable passages connecting the opposite ends of said chamber with the discharge of the pump, and an exhaust connecting said chamber with the trunk, and a valve arranged to control the supply and exhaust passages of the chamber and provided with means for connection with a commutator-shaft, whereby its position will be changed by reversals of motion in said shaft, substantially as and for the purpose set forth.

7. In a hydraulic attachment for electric motors, the combination, with the trunk, its inclosed pump, and means for operating said pump, of the cylinders R' and N, provided with pistons and rods adapted, as described, respectively for connection with the brushes of an electric motor, and a rheostat in the motor-circuit of the accumulator connected by suitable passages with the discharge of the pump and by other passages with said cylinders, the valves for controlling the flow of liquid to and from said cylinders, and means, substantially as described, arranged for operation by the electric motor, for controlling said valves, as set forth.

In testimony whereof I affix my signature in presence of two witnesses.

ELMER A. SPERRY.

Witnesses:
 H. D. SMALLEY,
 J. F. HARDIN.